United States Patent [19]
Cochran et al.

[11] 3,825,981
[45] July 30, 1974

[54] CARTRIDGE-TYPE CUTOFF AND GROOVING TOOL

[75] Inventors: Burton L. Cochran, North Canton; William B. Stein, Barberton, both of Ohio

[73] Assignee: The Warner & Swasey Company, Cleveland, Ohio

[22] Filed: Nov. 13, 1972

[21] Appl. No.: 306,363

[52] U.S. Cl. .................................. 29/96, 29/97
[51] Int. Cl. .......................................... B26d 1/00
[58] Field of Search .............................. 29/96, 97

[56] References Cited
UNITED STATES PATENTS

| | | | |
|---|---|---|---|
| 3,125,798 | 3/1964 | Stein | 29/96 |
| 3,189,975 | 6/1965 | Hammers | 29/96 |
| 3,354,526 | 11/1967 | Erkfritz | 29/96 |
| 3,376,763 | 4/1968 | Welles | 29/96 |
| 3,548,475 | 12/1970 | Fiori | 29/96 |

FOREIGN PATENTS OR APPLICATIONS
989,133    4/1965   Great Britain .......................... 29/96

*Primary Examiner*—Leonidas Vlachos
*Attorney, Agent, or Firm*—Freman & Taylor

[57]    ABSTRACT

An improved cutoff or grooving tool of the cartridge type is disclosed, including a cartridge assembly which comprises a support member, a clamping member, and a cutting insert, all of which are receivable in one or more pockets opening into the front and top faces of an elongate tool-holder body. The support member is mounted in the pocket in such a way that it is drawn down and into the pocket to provide the maximum rigidity to the forces encountered in the operation of the instrument. The assembly is releasably received in the pocket so that the entire assembly can be readily and quickly removed for replacement due to damage, change of size of cut, etc., without the necessity of providing special tooling in most instances.

7 Claims, 7 Drawing Figures

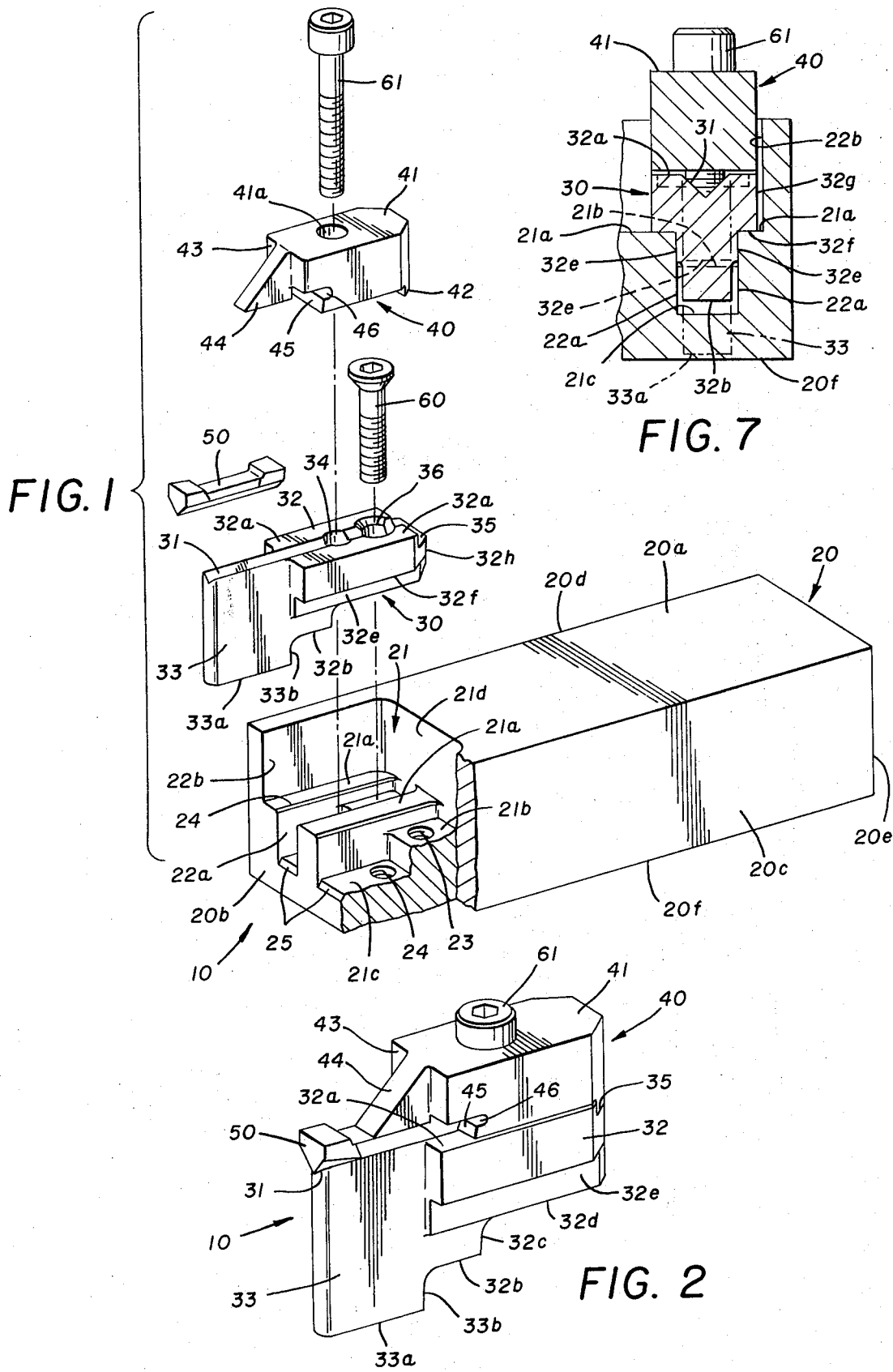

CARTRIDGE-TYPE CUTOFF AND GROOVING TOOL

BACKGROUND OF THE INVENTION

This invention, in general, relates to the art of metal cutoff or grooving and, in particular, relates to an improved assembly utilizing a tool-holder body with one or more pockets therein and a unique cartridge assembly which can be readily inserted into the pocket.

DESCRIPTION OF THE PRIOR ART

The following prior art is known to Applicant: Novkov, U.S. Pat. No. 2,737,705; Novkov, U.S. Pat. No. 2,846,756; Novkov, U.S. Pat. No. 2,897,579; Novkov, U.S. Pat. No. 2,964,833; Stein, U.S. Pat. No. 3,125,798; Emmons, U.S. Pat. No. 3,163,918; Davis, U.S. Pat. No. 3,371,567; Miller, U.S. Pat. No. 3,455,002; Cochran, U.S. Pat. No. 3,611,525; Cochran, U.S. Pat. No. 3,686,729.

There are, of course, a large number of additional cutting and grooving tools, none of which appear, however, to be any more pertinent than the above.

SUMMARY OF THE INVENTION

It has been discovered that a new and improved cartridge type grooving tool can be provided by providing a cartridge assembly which can be quickly and readily inserted into one or more pockets in the front end of a tool-holder body.

It has been found that by providing such an assembly that the removable and replaceable cartridge assembly, including a support member, a cutting insert, and a clamping member, are such that replacement due to damage, change of size of cut, and other eventualities can be quickly and easily accomplished.

It has been found also that by providing the support member with an overhanging and projecting front portion and, further, by providing unique interconnecting means between the support member and the pocket, the support member, and therefore the overall cartridge assembly, can be clamped within the pocket with maximum rigidity and resistance to the cutting forces encountered during the cutting operation.

It has also been found that a cartridge assembly and overall tool assembly of this nature can be made adaptable to either single or multiple mountings, and therefore single or multiple operations can be provided by simply inserting the desired cartridge within the pocket or pockets.

It has also been found that by utilizing a cartridge assembly within a pocket of this nature, symmetry can be achieved thereby minimizing the danger of tool damage during operation.

These and other objects of the invention will become more apparent upon a reading of the following brief specification, considered and interpreted in the light of the accompanying drawings.

OF THE DRAWINGS

FIG. 1 is an exploded perspective view partly broken away and in section and illustrating the component parts of the assembly.

FIG. 2 is a perspective view of the cartridge-type cutoff or grooving tool in its assembled condition.

FIGS. 5 and 6 are front elevations of the tool holder, with FIG. 5 showing the tool holder without the cartridge therein, while FIG. 6 shows one cartridge positioned within the tool holder.

FIG. 7 is a sectional view taken along the lines 7—7 of FIG. 4.

BRIEF DESCRIPTION OF THE PREFERRED EMBODIMENT

Figure 3:
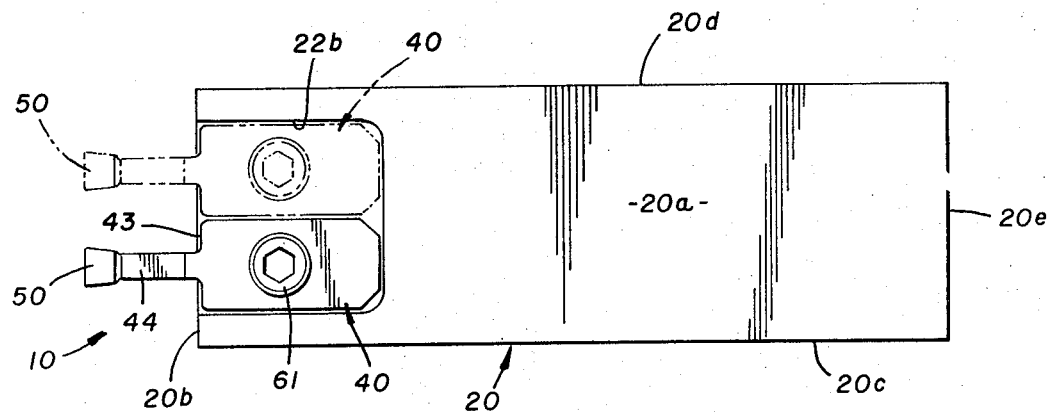
FIG. 3 is a top plan view thereof with one cartridge being shown positioned therein in full lines, while the remaining cartridge is shown positioned therein in chain-dotted lines.

Referring now to the drawings and in particular to FIGS. 1 and 2 thereof, the improved cartridge-type cutoff or grooving tool assembly, generally designated by the numeral 10, includes a tool-holder body 20, a support member 30, and a clamping member 40, with the arrangement being such that a cutting insert 50 can be supported upon the V-shaped upper edge 31 of the support member 30, with the insert being clamped in place and held tightly beneath the clamp 40 by tightening bolt 61 as will be explained below.

Considering next the structure of the tool-holder body 20 and referring to FIG. 1, it will be first noted that the same has an upper face 20a, a front face 20b, opposed side faces 20c and 20d, a rear face 20e, and a bottom face 20f.

It should be noted that the overall dimensions of the tool body may vary, as required, by the job at hand, with it being noted that in the instance shown in the drawings, provision is made for a pocket 21 in front face 20b that will accommodate two cartridges. Obviously by making the pocket wider, additional cartridges could be employed, and also in this regard it is to be noted that the pockets and cartridges could be staggered so as to project different amounts beyond the front face if so required by job application, in which case front face 20b would actually be several staggered faces in different planes rather than one face as illustrated.

The pocket, generally designated by the numeral 21, opens into the front face 20b and the upper face 20a so as to provide a pocket or seat in which the cartridge units may be positioned. Each pocket includes horizontal upper support surfaces 21a,21a, an intermediate horizontal surface 21b, and a lower horizontal support surface 21c, with vertical walls 22a and 22b defining the width of lower face 21c and intermediate face 21b, respectively.

Figure 4:
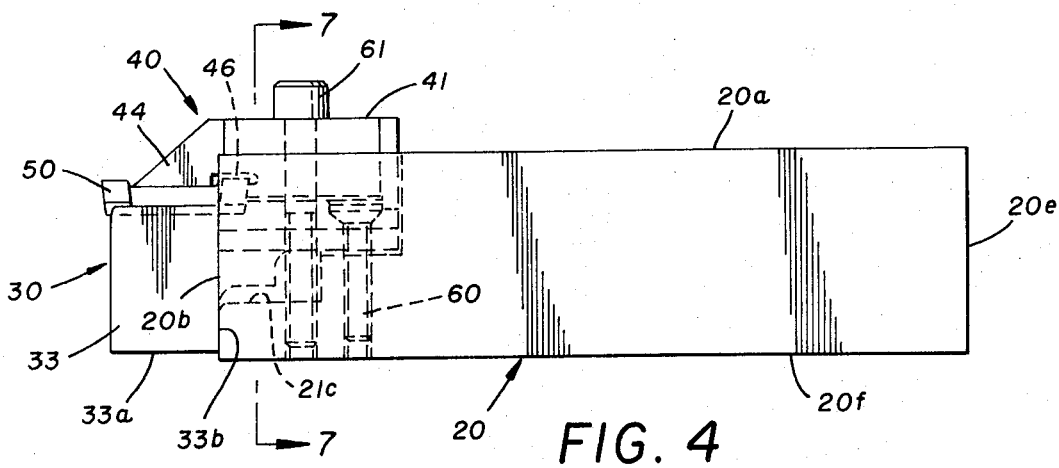
FIG. 4 is a side elevational view of the improved cartridge-type insert tool.
Figure 5:
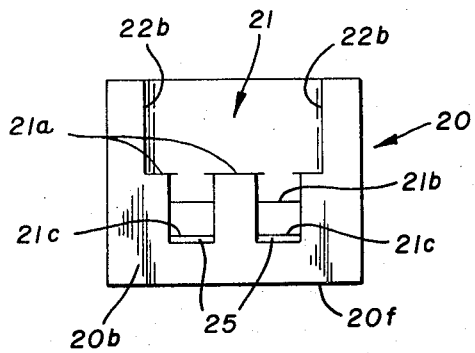
Figure 6:
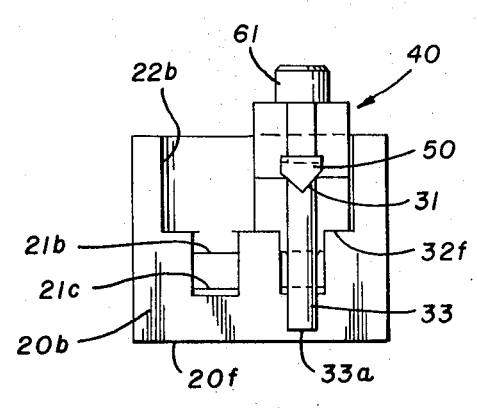

Again referring to FIG. 1, it will be noted that the intermediate face 21b has a tapped hole 23 provided therein for reception of the screw 60, while the lower face 21c has a similar tapped hole 24 provided therein for reception of the screw 61 as clearly shown in FIG. 4 of the drawings.

The lateral edges of the horizontal support surfaces 21a,21a are preferably chamfered as at 24 for clearance purposes, with a similar chamfer 25 being provided on one frontal portion of the lower horizontal support surface 21c.

It should be noted that pocket 21 can be machined into front face 20b of holder 20 at one setup on a vertical milling machine, jig borer, or similar machine after holder 20 is machined to its final outside dimensions and front face 20b has been established.

Turning next to the detailed construction of the support member that is generally indicated by the numeral 30, it will be noted that the same includes a body portion 32 designed to be received within the confines of the pocket 21 and a frontal blade portion 33 that is designed to project beyond body portion 32 as best shown in FIG. 2, for example.

The top surface 32a of the body portion 32 includes bores 36,34 for reception of the screws 60 and 61, with these bores or openings being intersected by the V-shaped support portion 31 that is formed on the top of the body portion and support portion of support member 30.

The configuration of the lower portion of the member 30 and the manner in which it is intended to coact with the surfaces of the pocket 21 will now be described.

In this regard the blade-like support portion 33 has a lower edge 33a which projects beyond the pocket and also has a rear vertical wall 33b which contacts front face 20b of the holder when the tool is assembled as will be described.

Vertical wall 33b merges into bottom surface 32b of body portion 32 which, in turn, has a vertical wall 32c which merges into bottom surface 32d so that the overall bottom of support member 30 presents a stepped configuration when viewed from the side.

The side walls of support member 30 are undercut as at 32e, and the body portion 32 thus presents projecting support shoulders 32a,32a. Finally, a ledge 35 extends transversely of the rear face 32h of the body portion 32 for coaction with the clamping member in a manner that will be described.

Inasmuch as the coaction between the various just-described surfaces of the support member 30 and the earlier described surfaces of the pocket are important in order to carry out the objective of the invention, reference is now made to FIG. 7 which is a sectional view taken along the lines 7—7 of FIG. 4 and showing the support blade in position within the pocket.

Thus the bottom portion 32f of the shoulders of the body 32 of the support member are shown resting on the horizontal support surfaces 21a,21a of the pocket. Side walls 32e,32e of the undercut portion of the body contact the vertical wall surfaces 22a,22a of the pocket. The vertical wall 33b of the support member contacts front face 20b of the tool-holder body 20. Certain surfaces also have clearance provided. Thus bottom surface 32b of the support member 30 clears and is spaced from the horizontal shelf 21c of the pocket, and rear wall 32h is spaced from the rear vertical surface 21d of the pocket. Furthermore, the side walls 32g,32g of the shoulders 32a,32a are spaced from the vertical wall surfaces 22b,22b of the pocket.

Turning again to FIGS. 1 and 2 for a detailed description of the clamp 40, the same is of generally block-like configuration and includes an upper surface 41 having a bore 41a therein for reception of the bolt 61. A depending rib 42 extends transversely of the rear portion of the member 40 for reception on the ledge 35 as clearly shown in FIG. 2 of the drawings. Projecting from the front face 43 is a clamping arm 44 that is intended to overlie the insert 50 when the same is seated on the V-shaped support surface 31, with this condition being clearly shown in FIG. 2 of the drawings.

In addition to the aforementioned component parts, the front face 43 is cut away at the lowermost portion to define an inclined support surface 45 and a clearance cutout 46, both of which extend transversely between the opposed sides of the clamping member.

By this arrangement and referring to FIGS. 2 and 4, it will be noted that the surface 45 serves as a back-up surface for the positioned insert, while the portion or cutout portion 46 clearly provides clearance for the cutting end presently not in use as shown in FIGS. 2 and 4.

In use or operation, it will first be assumed that the component parts have been provided in the approximate condition shown in FIG. 1 of the drawings. At this time it is merely necessary to drop the depending ribbed portion 32b into position between adjacent wall surfaces 22a,22a so that the support unit 30 will be positioned within the pocket, with the body portion 32 thereof being received within the confines of the pocket while the blade portion 33 thereof projects beyond the pocket as shown in FIG. 2. At this time it is merely necessary that the opening 36 be aligned with the threaded bore 23, and following this, the screw 60 may be passed through the opening 36 and threaded into the tapped aperture 23 and drawn tightly into place.

In this regard the centerlines of bores 36 and 23 are slightly off center so that tightening of bolt 60 will cause support member 30 to be drawn downwardly and to the rear of the pocket. In this way wall 33b will be drawn into abutment with front face 20b for improved stability.

Insert 50 can then be positioned on the V-shaped top 31 of blade portion 33, or this can be done later if desired.

Following this, the clamping member 40 is positioned on top of the body portion of the support blade, with the opening 41a being aligned with the opening 34 and the threaded aperture 24. Following this, it is merely necessary that the bolt 61 be passed through openings 41a and 34 and thence threaded lightly into threaded aperture 24, following which the insert can be positioned and located against the face 45, following which the unit will be ready for operation upon complete tightening of the bolt 61.

It will be noted at this point that the bolt 61, operating through clamp 40, not only holds the insert 50 on the support member 30, but it also serves to hold the support member 30 on the tool body 20, operating through the insert 50 on one end and the rear of the clamp 42 at the other end.

It follows from the above that changing of the bit would merely require the untightening of the bolt 61, followed by removal of the bit and either reversal thereof on the support blade or replacing the same with a new bit. In the event that replacement of the entire cartridge is necessary, it will be, of course, necessary to remove the bolt 60.

It will be seen from the foregoing how there has been provided a new and improved type of cartridge-type cutoff tool that is "quick change" in nature and has versatility through a wide range of applications.

It will be seen how the provision of a "cartridge-type" type of insert eliminates the need for special tooling with respect to the tool holder, which can be made by the owner with the simplest of machinery to suit the job specification under consideration.

While a full and complete description of the invention has been set forth in accordance with the dictates of the Patent Statutes, it is to be understood that the invention is not intended to be limited to the specific form herein shown.

Accordingly, modifications of the invention may be resorted to without departing from the spirit hereof or the scope of the appended claims.

What is claimed is:

1. A grooving and cutting tool of the character described, comprising;
    A. a tool holder having an upper face and a front face;
    B. a pocket
        1. opening into said upper face and said front face, and
        2. having spaced-apart supporting surfaces that are parallel to each other and parallel to but spaced beneath the plane of said upper face,
    C. a support member adapted to be received in said pocket and having
        1. a body portion that includes a top portion and spaced-apart parallel surfaces adapted to be received on said support surfaces of said pocket when said support member is positioned therein, and
        2. a co-extensive blade-like portion projecting co-extensively from said body in longitudinal symmetry therewith and extending beyond said front face of said tool body when said support member is received in said pocket;
        3. a cutting insert releasably secured to said support member, and
        4. a clamping member releasably secured to said support member and adapted to hold said cutting insert on said support;
    D. said blade portion extending below the plane of said spaced-apart parallel surfaces of said body portion of said support member and having a rear face; and
    E. securing means for drawing said rear face of said blade portion into engagement with said front face of said tool holder while drawing said support member downwardly and rearwardly.

2. The device of claim 1 further characterized by the fact that said blade-like portion has a top surface that is parallel to the top surface of said body portion of said support member.

3. The device of claim 2 further characterized by the presence of a V-shaped groove extending longitudinally of said top surface of said body and blade portions of said support member.

4. The device of claim 3 further characterized by the fact that at least one vertical aperture is provided between the top and bottom surfaces of said body portion of said support member; said aperture opening into said V-shaped groove.

5. The device of claim 1 further characterized by the fact that the transverse width of said body portion of said support member substantially exceeds the transverse width of the blade portion thereof.

6. The combination of claim 1 further characterized by the presence of the following elements:
    A. an elongate cutting bit having
        1. a V-shaped bottom surface adapted to be received on said V-shaped groove of said support member,
        2. a top surface that will be parallel to said top surface of said body portion of said support member when said insert is received on said V-shaped surfaces; and
    B. clamping means shiftably carried by said tool holder and adapted to releasably secure said insert with respect to said V-shaped groove.

7. A support member for use in a grooving and cutting tool including a tool holder having an upper face and a front face and a pocket opening into said upper face and said front face and having spaced-apart supporting surfaces that are parallel to each other and parallel to but spaced beneath the plane of said upper face, said support member comprising;
    A. a body portion that includes a top portion and spaced-apart parallel surfaces adapted to be received on said support surfaces of said pocket when said support member is positioned therein;
    B. a co-extensive blade-like portion projecting co-extensively from said body in longitudinal symmetry therewith and extending beyond said front face of said tool holder when said support member is received in said pocket;
    C. said blade portion extending below the plane of said spaced-apart parallel surfaces of said body portion of said support member and having a rear face; and
    D. means for drawing said rear face of said blade portion into engagement with said front face of said tool holder.

* * * * *